June 12, 1928.

Re. 16,993

A. STECHBART

PORTABLE TALKING MACHINE

Original Filed Sept. 18, 1916

Inventor

Arthur Stechbart

By Mauro, Cameron, Davis & Hankam

Attorneys

Reissued June 12, 1928. Re. 16,993

UNITED STATES PATENT OFFICE.

ARTHUR STECHBART, OF CHICAGO, ILLINOIS, ASSIGNOR, BY MESNE ASSIGNMENTS, TO FINNEY B. SMITH.

PORTABLE TALKING MACHINE.

Original No. 1,230,614, dated June 19, 1917, Serial No. 120,596, filed September 18, 1916. Application for reissue filed November 22, 1924. Serial No. 751,667.

This invention relates to a compact formation and association of the component parts of a talking machine adapted to be folded together into a compact and convenient form for transportation from place to place. And the present improvement has for its object to provide a structural formation and association of parts whereby the talking machine may be compactly folded together, and with which provision is made for the convenient storage of a stock of sound records, all as will hereinafter more fully appear.

In the accompanying drawing.

Similar reference numerals indicate like parts in both views.

Figure 1:
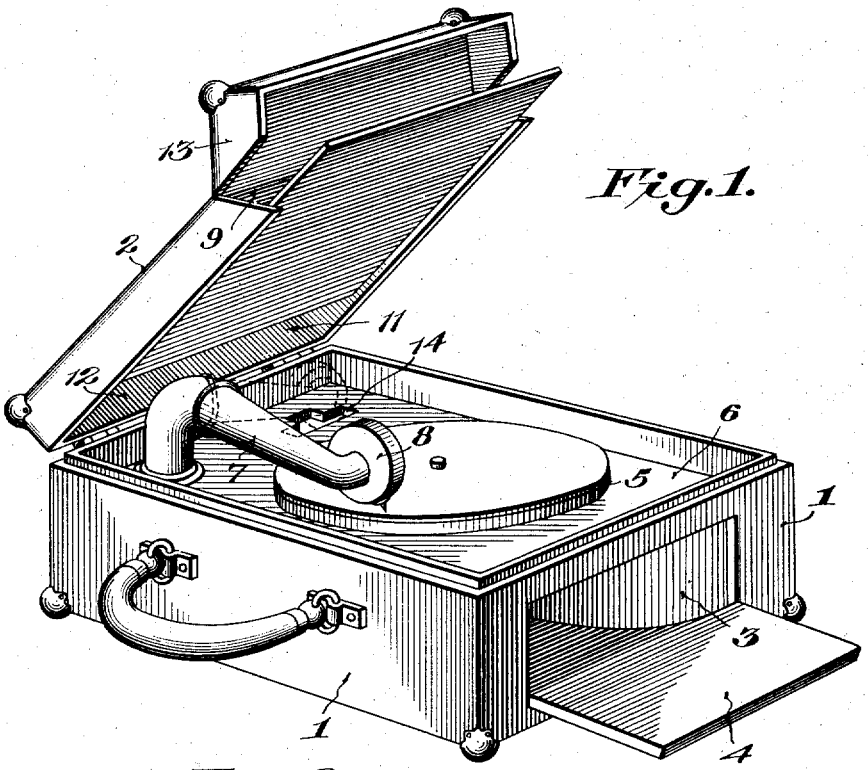
Figure 1, is a perspective view of a talking machine embodying the present invention, with the parts shown in an open and active position, and with the sound box arm shown in an inactive position in dotted lines.

Referring to the drawing, 1 designates the body portion, and 2 the hinged cover portion of the inclosing casing of a talking machine of the disk-record type, the parts being finished and trimmed to resemble a traveling suit case or the like. The body portion 1 is preferably of a rectangular box form and houses the motor mechanism as well as the fixed forwardly extending sound amplifying conveyor or horn 3 of the machine. The outlet end of said conveyor or horn 3 is associated with a sound regulating door 4 or like provision in the front wall of the body portion 1 of the machine casing.

5 designates the record carrier, mounted to rotate above the top web or closure 6 of the body portion 1 of the machine casing, and adapted to receive rotation from a suitable motor arranged in said body portion 1.

7 designates the horizontally swinging tone or sound box arm, pivotally associated with the inner end of the conveyor or horn 3 aforesaid, and carrying at its free end the sound box or reproducer 8, as shown.

The construction and arrangement of parts so far described are common to talking machines now in general use, and may be of any ordinary and usual type, the material part of the present invention comprising in connection therewith features as follows:—

Figure 2:
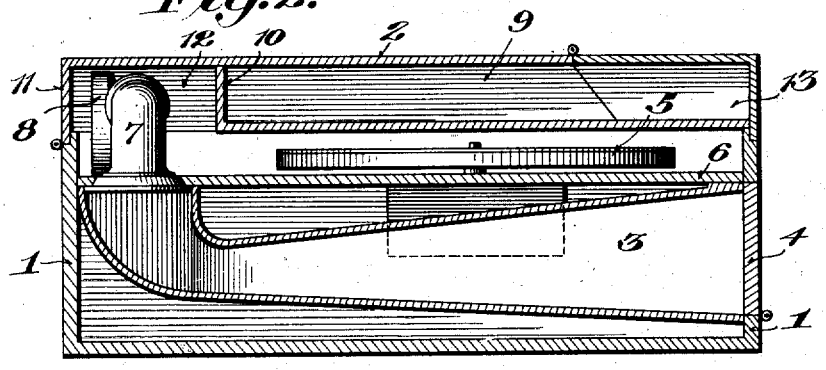
Fig. 2, is a longitudinal sectional elevation of the same, with the parts in a closed and inactive position.

9 designates a sound-record storage chamber formed on the under side of the hinged cover 2 of the machine casing, with its rear wall 10 disposed a distance in front of the rear wall 11 of said cover to provide an open bottom space or chamber 12, to receive the sound box arm 7 aforesaid, when the same is in its inactive position as illustrated in full lines in Fig. 2 and in dotted lines in Fig. 1.

13 designates a lid or door of the drop-type, hinged at the open front end of the storage chamber 9 aforesaid, and adapted to afford convenient access through the open front of said chamber to the sound records stored therein, and to close said chamber and protect the sound records when the machine is closed for storage, transportation, etc.

14 designates a recess formed in the top board or web 6 of the machine casing, and adapted to receive the lower portion of reproducer 8 and its needle and needle carrier when the machine is in its closed condition, to hold said parts in place, and at the same time decrease the height required in the chamber 12 aforesaid, as illustrated in Fig. 2.

Having thus fully described my said invention, what I claim as new and desire to secure by Letters Patent, is:—

1. A casing comprising, a rectangular box-shaped body member having a sunken partition providing an open top chamber for the record carrier of a talking machine, a cover member hinged at its rear end to said body member and divided by an L shape partition into a forward storage chamber and a rearward open bottom chamber adapted to receive the reproducer and tone arm of a talking machine after the same has been swung back into an inoperative position.

2. A casing comprising, a rectangular box-shaped body member having a sunken partition providing an open top chamber for the record carrier of a talking machine, a cover member hinged at its rear end to said body member and divided by an L shape partition into a forward storage chamber and a rearward open bottom chamber adapted to receive the reproducer and tone arm of talking machine after the same has been swung back into an inoperative position, the aforesaid sunken partition having a recess for the reception of the lower portion of said reproducer.

3. A casing comprising a rectangular box-shaped body member having a sunken partition providing an open-top chamber for the record carrier of a talking machine, means including a wall extending in a direction from front to rear of said body member beneath said partition to constitute a sound amplifying horn, a cover member hinged at its rear end to said body member, and a record storage element carried by said cover, said record storage element being spaced from the rear end of said cover so as to provide a rearward open-bottom chamber adapted to receive the reproducer and tone-arm of a talking machine after the same have been swung back into an inoperative position and said record storage element substantially filling said cover forward of said open-bottom chamber.

4. A casing comprising a rectangular box-shaped body member having a sunken partition providing an open-top chamber for the record carrier of a talking machine, means including a wall extending in a direction from front to rear of said body member beneath said partition to constitute a sound amplifying horn, a cover member hinged at its rear end to said body member and divided by an L-shape partition into a forward storage chamber and a rearward open-bottom chamber adapted to receive the reproducer and tone-arm of a talking machine after the same have been swung back into an inoperative position, and pivoted means for rendering said forward storage chamber accessible from the forward end therefor for the introduction and withdrawal of record tablets.

5. A casing comprising a box-shaped body member having a partition forming a chamber therebeneath which is adapted to receive driving mechanism for a talking machine, means including a wall extending in a direction from front to rear of said body member beneath said partition to constitute a sound amplifying horn, a cover member including a top and side walls hinged to said body member, and record storage means within the chamber formed by the top and side walls of said cover, said record storage means being provided with a movable member to facilitate access to the records and being spaced from one of the side walls of said cover to provide an open bottom chamber adapted to receive the reproducer and tone arm of a talking machine after the same have been swung into an inoperative position.

6. In a talking machine casing of the type wherein a record carrier and a tone arm. provided with a reproducer, are operatively mounted on a sunken partition within said casing, the combination with the casing of a cover member hinged at its rear end to the casing, and a partition dividing the cover into a forward storage chamber for talking machine sound records substantially filling the forward parts of said cover, said partition extending from side to side of said cover member and from the forward end of the cover member to a point laterally spaced from the rear, hinged end of said cover member, the space between the termination of the partition and the rear, hinged side of said cover member constituting a chamber or open bottom space for receiving said tone arm and reproducer when the latter are swung out of position for engagement with the record on the record carrier and the cover is moved to closed position.

In testimony that I claim the foregoing as my invention, I affix my signature, this 19th day of November, A. D. 1924.

ARTHUR STECHBART